(12) United States Patent
Naunheimer et al.

(10) Patent No.: US 7,749,467 B2
(45) Date of Patent: ***Jul. 6, 2010

(54) OPTIMIZER HYDRAULIC ENHANCEMENT USING MILLED PLATE

(75) Inventors: Christopher Naunheimer, Arlington Heights, IL (US); Michael J. Vetter, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/958,981

(22) Filed: Dec. 18, 2007

(65) Prior Publication Data

US 2009/0154632 A1    Jun. 18, 2009

(51) Int. Cl.
*B01J 8/04* (2006.01)
*B01J 8/02* (2006.01)
*B01J 8/44* (2006.01)

(52) U.S. Cl. .................. 422/218; 422/190; 422/192; 422/211; 422/220; 422/239; 422/311

(58) Field of Classification Search ............... 422/192, 422/190, 311, 211–212, 216, 218–221, 239, 422/176, 181; 34/582–584, 174; 96/139, 96/152; 210/291, 286
See application file for complete search history.

(56) References Cited

U.S. PATENT DOCUMENTS

| | | | | |
|---|---|---|---|---|
| 2,634,194 A * | 4/1953 | Nebeck | ............ | 422/218 |
| 4,096,911 A * | 6/1978 | Geske | ............ | 166/234 |
| 4,167,553 A | 9/1979 | Persico et al. | ............ | 422/216 |
| 4,244,922 A | 1/1981 | Burke et al. | ............ | 422/218 |
| 4,276,265 A * | 6/1981 | Gillespie | ............ | 422/311 |
| 4,421,723 A * | 12/1983 | Farnham | ............ | 422/218 |
| 4,567,023 A | 1/1986 | Greenwood et al. | ............ | 422/192 |
| 4,971,771 A * | 11/1990 | Stahl | ............ | 422/218 |
| 5,089,115 A * | 2/1992 | Koves | ............ | 208/146 |
| 5,118,419 A * | 6/1992 | Evans et al. | ............ | 210/291 |
| 5,156,738 A * | 10/1992 | Maxson | ............ | 210/274 |
| 5,209,908 A | 5/1993 | Koves et al. | ............ | 422/218 |
| 5,328,593 A | 7/1994 | Owen et al. | ............ | 208/113 |
| 5,346,610 A | 9/1994 | Owen et al. | ............ | 208/113 |
| 5,366,704 A | 11/1994 | Koves et al. | ............ | 422/218 |
| 5,618,426 A * | 4/1997 | Eischen et al. | ............ | 210/541 |
| 5,827,485 A * | 10/1998 | Libal et al. | ............ | 422/179 |
| 6,059,961 A | 5/2000 | Koves et al. | ............ | 208/146 |
| 6,098,965 A | 8/2000 | Jacobs et al. | ............ | 261/114.2 |
| 6,224,838 B1 | 5/2001 | Schulz et al. | ............ | 422/218 |
| 6,338,828 B1 | 1/2002 | Stupin et al. | ............ | 422/224 |
| 6,508,459 B1 | 1/2003 | Jacobs et al. | ............ | 261/114.2 |
| 6,569,389 B1 | 5/2003 | Koves et al. | ............ | 422/219 |
| 6,773,580 B2 | 8/2004 | Boger et al. | ............ | 208/134 |
| 6,881,387 B1 | 4/2005 | Jacobs et al. | ............ | 422/224 |
| 6,984,365 B2 | 1/2006 | Nelson et al. | ............ | 422/224 |
| 7,226,568 B1 * | 6/2007 | Ham et al. | ............ | 422/218 |
| 2008/0107575 A1 * | 5/2008 | Vetter et al. | ............ | 422/211 |

FOREIGN PATENT DOCUMENTS

WO     WO0166239 A2     9/2001

\* cited by examiner

*Primary Examiner*—Walter D Griffin
*Assistant Examiner*—Huy-Tram Nguyen
(74) *Attorney, Agent, or Firm*—Mark Goldberg

(57) ABSTRACT

A radial flow reactor fluid duct distribution apparatus is presented. The apparatus includes a plate of sufficient thickness to impart strength to the fluid flow duct and is milled to have narrow slots allowing fluid to flow through the plate, while preventing the passage of catalyst through the plate.

16 Claims, 4 Drawing Sheets

OPTIMIZER HYDRAULIC ENHANCEMENT USING MILLED PLATE

BACKGROUND OF THE INVENTION

This invention relates to cross-flow reactors or adsorbers where a fluid flows across a moving bed of catalyst or adsorbent. In particular, this relates to the internal components for distribution flow of the fluid and for providing a device for preventing the flow of catalyst or adsorbent across the inlet or outlet screens.

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

One type of inlet distribution device is a reactor internal having a scallop shape and is described in U.S. Pat. No. 6,224,838 and U.S. Pat. No. 5,366,704. The scallop shape and design provides for good distribution of gas for the inlet of a radial flow reactor, but uses screens or meshes to prevent the passage of solids. The scallop shape is convenient because it allows for easy placement in a reactor without concern regarding the curvature of the vessel wall. The screens or meshes used to hold the catalyst particles within a bed are sized to have apertures sufficiently small that the particles cannot pass through. A current optimizer, Optimiser™, design by United States Filter Corp., PCT application no. WO 01/66239 A2, has an improved shape, but still uses a screen comprised of wires having a sufficiently narrow spacing to prevent the passage of catalyst. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. Catalyst containment loss can be due to mechanical failure of profile wire screens due to either component differential thermal growth or thermally cyclic operating environment. Differential thermal growth can cause bending of the profile wires creating a fish-eye formation, and catalyst bed pressure dynamics can create problem areas in the profile wire screens. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

BRIEF SUMMARY OF THE INVENTION

The present invention provides for a new screen design that is less sensitive to a corrosive or thermal operating environment and thus reduces the failure of a reactor during operation. The invention comprises an inlet duct having an elongated tubular structure having a substantially trapezoidal cross section. The inlet duct comprises a front face, two side faces, and a rear face. The side faces and rear faces are solid panels for containing fluid within the duct. The front face comprises a panel that has a first side that is the side in contact with solid particles outside the duct, and a second side that is the side facing inward to the center of the duct and in contact with fluid in the duct. The first side has slots formed therein in a parallel manner and with the slots running the length of the front face of the inlet duct. The second side has holes formed therein, which pass part of the distance through the front face and intersect with the slots from the first side, thereby allowing fluid to flow through the front face by flowing into the holes, passing to the slots and out of the slots. The slots are sized to prevent the passage of solid particles through the front face.

In an alternate construction of the invention, the inlet duct comprises a distribution apparatus for a radial flow reactor, wherein the radial flow reactor comprises a substantially cylindrical vessel having a fluid inlet and a fluid outlet. The vessel further includes a center pipe disposed within the vessel and along the center axis of the vessel, and where the center pipe wall has apertures defined therein for the passage of fluid through the wall of the centerpipe. The radial flow reactor further includes a plurality of inlet ducts arranged circumferentially around the interior of the vessel wall, where each duct comprises an elongated tubular structure having a substantially trapezoidal cross section, and each duct has a front face, two side faces and a rear face, and where the front face is oriented facing the center of the reactor. The front face comprises a milled plate having slots formed therein on a first side and holes formed therein on the second side where the holes pass part way through the front face until the holes intersect the slots. The reactor has a solid bed retention volume for the holding of solid catalyst particles disposed between the center pipe wall and the plurality of inlet ducts.

Other objects, advantages and applications of the present invention will become apparent to those skilled in the art from the following detailed description and drawings.

DETAILED DESCRIPTION OF THE INVENTION

Figure 1:
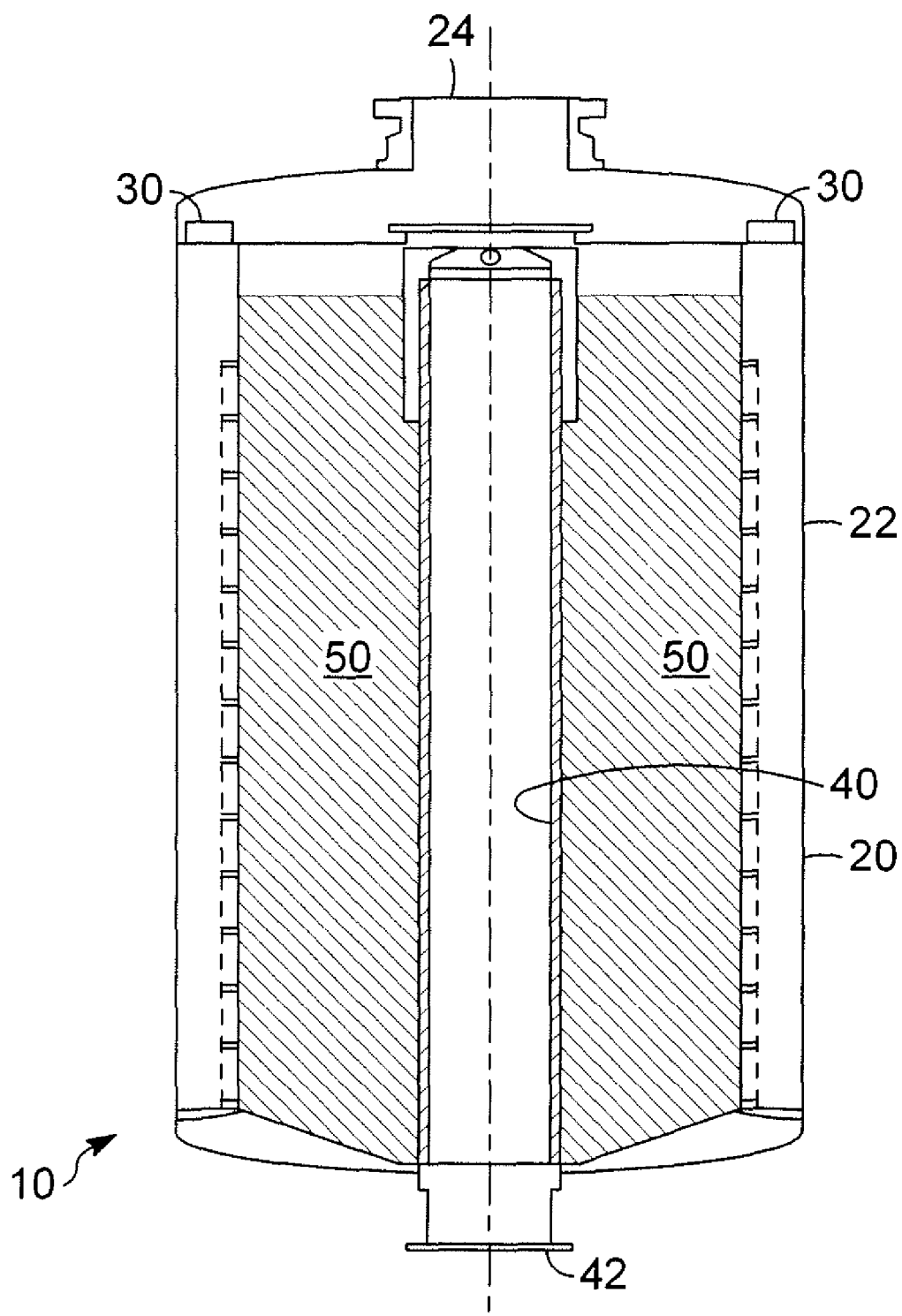
FIG. 1 is a schematic of a vertical cross section of a radial flow reactor.

The buckling of radial flow reactor inlet ducts, also know as scallops, is a serious problem that can cause significant downtime. A stronger radial flow reactor inlet duct will alleviate some of the issues. However, just increasing the strength of the inlet duct is only one problem to be addressed. The inlet duct is designed to provide a uniform inlet flow into the reactor. The strengthening of the inlet duct often leads to designs that do not provide a uniform flow distribution of fluid across the inlet face of the inlet duct.

The current state of the art using profile wire screen meshes has numerous drawbacks as to the structural integrity of the screen. The profile wire screen has the wires bonded to support members, and due to the construction method, the support members are not perpendicular to the profile wires, but are at an angle less than perpendicular. The strength of the profile wire screen is subject to the size of the wires, the strength of the bond between the wires and the support members, and the orientation of the support members relative to the profile wires. Increasing the size of the support members to increase the strength of the profile wire screens produces a structure that reduces the uniformity of flow to the screen. The present invention overcomes difficulties due to differential thermal growth, thermally cyclic operating environments, or spreading of profile wires creating gaps in the screen. This is due to an integral design that makes the present screens more thermally insensitive and less discontinuous, in contrast to the profile wire screen that is a composite component construction and is highly discontinuous.

A new apparatus for an improved strength flow distribution device overcomes the shortcomings of the current profile wire screen. The apparatus is disposed within a radial flow reactor for contacting a fluid with a solid catalyst or other solid material. The apparatus for an inlet duct comprises an elongated duct having a front face, two side faces and a rear face. The cross-section of the duct is substantially trapezoidal. The front and rear faces can be curved or straight, where the curvature is designed to match the curvature of the cylindrical vessel wall. The side and rear faces comprise solid walls providing strength to the duct and for containing fluid within the duct and distributing the fluid to the front face. The front face comprises a solid plate that has a first side which will be the side facing, and in contact with, the catalyst or solid material that is in the reactor, and a second side facing the interior of the duct. The plate comprises slots formed therein in the first side of the plate in a parallel manner and the plate is oriented such that the slots run along the axial direction of the inlet duct. The plate further comprises drilled holes in the second side of the plate, where the holes are drilled to intersect the slots in the first side of the plate. Fluid is then able to pass from the inlet duct into the drilled holes and through the slots of the front face and into the reactor bed. The present invention provides for a more uniform fluid distribution across the screen face, due to having a smoother design without the need for support members as in the profile wire screens that disturb the flow and whose support members create localized pressure drops over portions of the screen.

In one embodiment, the invention comprises a radial flow reactor. The reactor comprises a vertically oriented, and substantially cylindrical vessel having a vessel wall and a fluid inlet and a fluid outlet. The reactor further includes a vertically oriented centerpipe disposed within the vessel and oriented substantially along the longitudinal axis of the vessel. The centerpipe comprises a tubular structure having apertures defined therein, where fluid can flow through the apertures, and where one end of the centerpipe is in fluid communication with either the reactor fluid inlet or fluid outlet. This embodiment further includes a plurality of fluid ducts arranged circumferentially around the interior of the vessel wall, where each fluid duct comprises four sides forming a duct with a transverse cross-section of a substantially trapezoidal shape. The four sides comprise a front face, two side faces, and a rear face where the rear face is proximate to the reactor vessel wall, and the front face is disposed on the side distal to the rear face. The front face comprises a plate having a first side milled with parallel slots running the length of the plate and a second side having holes drilled into the plate, where the holes extend from the second side until the holes meet the interior most point of the slots. The first side is the catalyst side and allows for catalyst to flow along the length of the front face, while the second side is the non-catalyst side and allows for fluid to be distributed over the second side and to pass through the front face and contact the catalyst. The catalyst is held in a solid particle retention volume that is defined by the space between the center pipe and the front faces of the fluid ducts.

The invention can best be seen through the views of figures showing details of the invention. FIG. 1 depicts a cross section of a radial flow reactor 10. The reactor 10 can be a fixed bed reactor, or a moving bed reactor where the catalyst in the bed 50 flows downward through the reactor 10. The reactor 10 includes a reactor vessel 20 having a vessel wall 22 which will generally be a cylindrically shaped vessel. Fluid enters the vessel 20 through a main inlet duct 24 and is distributed to the fluid inlet ducts 30, disposed circumferentially around the inside of the vessel wall 22. A central outlet pipe 40 is disposed along the axis of the cylindrical vessel 20. The central outlet pipe 40 is perforated, or formed with a screen, or mesh to prevent the passage of catalyst, while allowing the fluid to flow from the catalyst bed 50 into the pipe 40. The catalyst bed 50 is defined by the space between the inlet ducts 30 and the outlet pipe 40. The outlet pipe 40 is in fluid communication with an outlet duct 42, where a product stream from a reaction in the reactor is collected.

Figure 2:
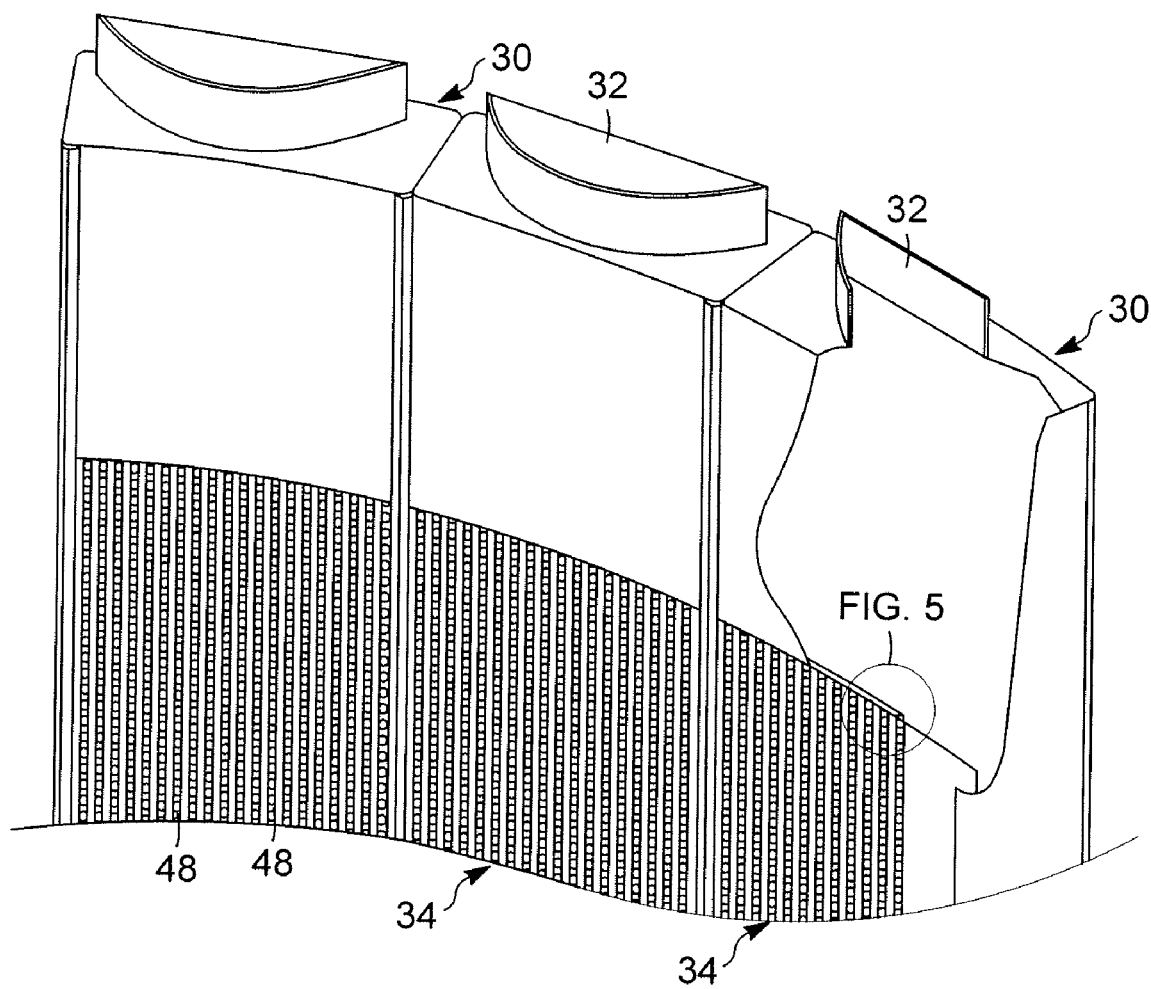
FIG. 2 is a schematic of a section of the reactor showing inlet distribution members that are disposed circumferentially around the radial flow reactor.
Figure 3:
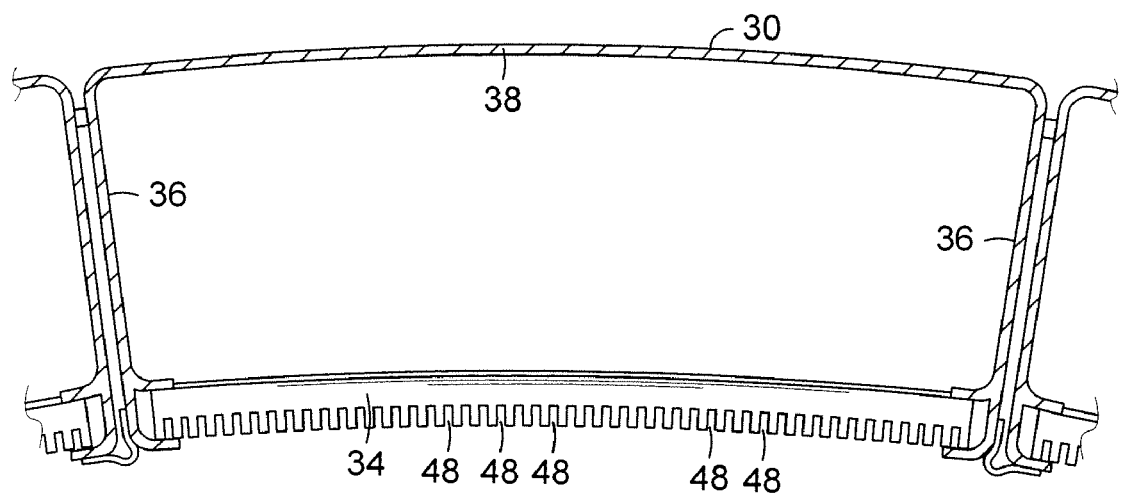
FIG. 3 is a horizontal cross section of an inlet distribution member of the present invention showing the milled and drilled screen in the distribution member.

An enlargement of a section of the reactor 10 as shown in FIG. 2 is a schematic of several of the inlet ducts 30. Fluid flows into the inlet ducts 30 through an inlet port 32 and distributes over the front face 34 of the inlet duct 30. The front face 34 is made of a milled plate 35 that is thick enough to give substantial structural support to the inlet duct 30 and to prevent breakthrough from pressure exerted by catalyst on the catalyst bed side of the front face 34. A cross sectional schematic of an individual inlet duct 30 is shown in FIG. 3. The inlet duct 30 includes side faces 36 and a rear face 38. The rear face 38 is disposed proximate to the vessel wall 22, and the side faces 36 are proximate to the side faces 36 of neighboring inlet ducts 30. The front face 34 has a first side 44 and a second side 46, where the first side 44 is in contact with the solid catalyst bed 50 and the second side is on the interior of the inlet duct 30, or fluid side of the front face 34. The front face 34 includes parallel slots 48 that run the length of the front face 34 as can be seen in FIGS. 2 and 3.

From FIG. 3, it is preferred that the front face 34, and the rear face 36 have a curved structure. The curvature for the rear face 36 is substantially the same curvature of the reactor vessel wall 22. The front face 34 is preferred to have a curvature to be substantially the curvature of a cylinder having the radial distance from the center axis of the vessel 20 to front face 34 of the inlet duct. From FIG. 2, it can be seen that the preferred configuration is to have the slots 48 are parallel to each other and run the axial length of the inlet duct 30, for the region where there is fluid catalyst contact. In an alternative embodiment, with a radial flow reactor 10 having a relatively large number of inlet ducts 30, such as greater than about 20 inlet ducts, the front face 34 can be maintained as having a planar structure without curvature. The choice of a planar or curved structure for the front face 34 would be subject to manufacturing considerations. For a large number of ducts, for example greater than 20, a planar structure fro the front face might be sufficient for the design of the reactor.

The slots 48 in the first side have a width of less than 1.2 mm, preferably a width of less than 1 mm, and more preferably less than 0.7 mm. The slots 48 are spaced from 2 to 5 mm apart, with the spacing defined as the space including the material between the slots and the width of one slot 48. Preferably the spacing is from 2 to 3.5 mm and more preferably the spacing is from 2.5 to 3.5 mm. During the process of manufacture of the milled plates 35, the slots 48 can exceed the width to a minor extent, as the plates 35 are rolled to form a curved surface, and the width of the slots 48 will be reduced based upon the amount of curvature applied to the milled plates 35.

Figure 4:
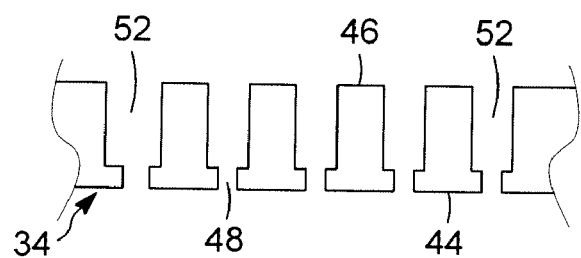
FIG. 4 is an enlarged cross section schematic of a portion of the milled and drilled screen.

An enlarged cross-section of the milled plate 35 is shown in FIG. 4. The cross-section cuts through a portion that includes the slots 48 milled into the first side 44 and holes 52 drilled into the second side 46. The holes 52 are drilled a portion of the way through the second side 46 of the front face 34 to a depth sufficient to intersect the slots 48 milled from the first side 44 of the front face 34. The holes 52 are drilled with a diameter of less than 5 mm. In one embodiment, the slots 48 extend approximately between 25% and 33% of the distance through the plate 35 and the holes 52 extend approximately 66% to 75% of the distance through the plate 35. The holes 52 are drilled in a pattern such that the holes 52 form a line that is aligned with the corresponding slot 48 through which the holes 52 are in fluid communication. The centers of the holes 52 in a vertical line will form a series of parallel lines to one another. The center to center distance of holes 52 on a vertical line will be between 175% and 300% the diameter of the holes 52. The holes 52 can form a rectangular orientation for the distribution of holes 52 over the second side, but preferably the holes 52 forming neighboring lines are offset and have a pitch between 25° and 35°. In one embodiment, the holes 52 may be tapered either the entire depth of the holes 52, or a portion of the depth of the holes 52.

Figure 5:
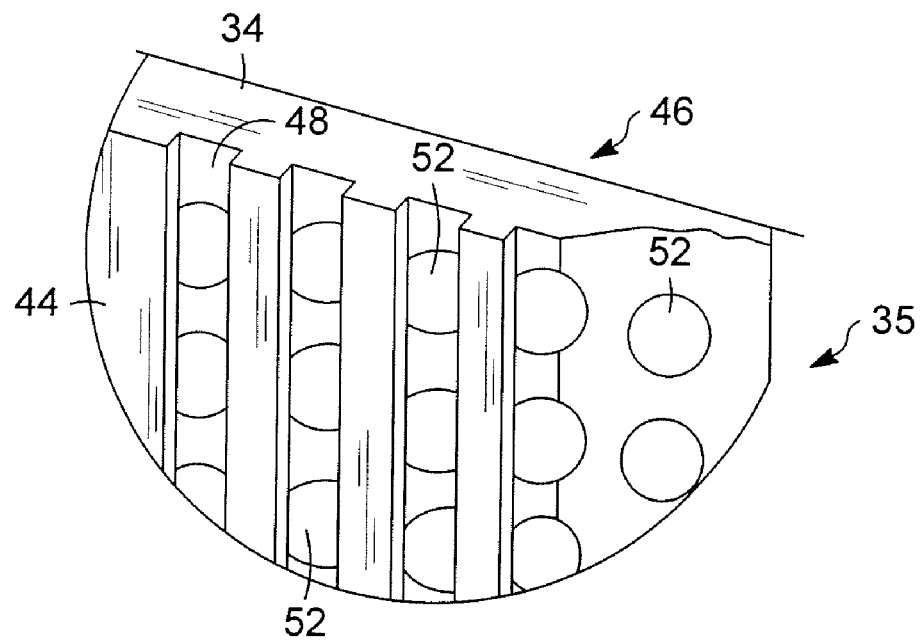
FIG. 5 is an enlargement of a sectional view of the milled and drilled screen.

FIG. 5 shows an enlargement of a cut away section of the milled plate 35. The plate comprises a first side 44 having slots 48 milled into the first side 44 and cut lengthwise along the plate 35. Holes 52 have been drilled from the reverse, or second side 46, of the plate 35 and extend from the second side 46 surface until the holes reach the slots 48 milled in the first side 44. When a portion of the plate 35 is cut away at a depth greater than the depth of the slots 48, only the holes 52 drilled from the second side 46 are present. In this schematic, the holes 52 are presented in a rectangular array.

Figure 6:
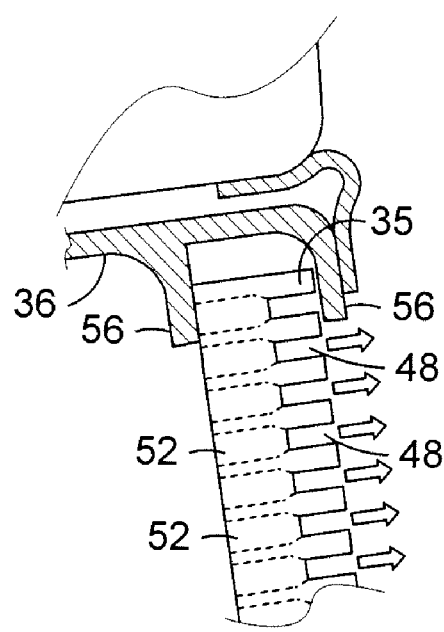
FIG. 6 is a top down view of a schematic of a section of the milled screen.

The milled plate 35 is affixed to the side faces 36 of the ducts 30. As shown in FIG. 6, a top down sectional view of the plate 35 is held in place through flanges 56 affixed to the side faces 36 of the ducts 30. Flexible standoff members 60 can be used to create a seal between neighboring ducts 30, or other means known to those skilled in the art for permitting the placing of the ducts 30 around the inside of the vessel wall 22, while creating a seal sufficient to prevent catalyst from entering any gaps between neighboring ducts 30. The holes 52 are in the interior of the plate 35 and are not seen from the top down view, but are shown through the dashed lines. In this embodiment, the holes 52 are tapered from the width of the hole diameter to the width of the slots 48.

Radial flow reactors are used in numerous chemical processes, especially in the hydrocarbon processing industry. The process comprises passing a feed stream through the reactor inlet duct 24. The feedstream comprises a mixture of hydrocarbons to be reacted over a catalyst. The feedstream is distributed to the inlet ducts 30 where the feedstream flows down the ducts 30 and flows across the front faces 34 of the ducts 30. The front faces 34 provide a pressure drop for the feedstream to distribute over the front face 34 and to flow uniformly through the front face 34. For a moving bed reactor, a catalyst flows in through the top of the reactor 10 through a catalyst inlet port, and flows down through the catalyst bed 50. The feedstream flows across the catalyst bed 50 where the components of the feedstream react to form a product stream. The product stream passed through the perforated center pipe 40 and is withdrawn from the reactor 10 through the reactor outlet duct 42. While the present description is of a radial flow reactor where the flow is into the inlet ducts 30, across the catalyst bed 50 and out the center pipe 40, the process and the invention is equally applicable to operation where the fluid flows into the center pipe 40, across the catalyst bed 50 and out the ducts 30.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus directing a fluid in a cross flow reactor comprising:
   an elongated inlet duct comprising a front face, two side faces, and a rear face, having a substantially trapezoidal cross-sectional shape and wherein the front face comprises a milled plate comprising a first side having slots formed therein in a parallel manner and a second side having holes wherein the holes are formed and intersect the slots to allow for the passage of fluid through the plate.

2. The apparatus of claim 1 for a radial reactor, where the radial reactor has an inner solid particle zone disposed within a reactor vessel, and where the front face and rear face have a curved structure, and where the radius of curvature for the milled plate is equal to the radius of the reactor solid particle zone and the radius of curvature for the rear face is equal to the radius of the reactor vessel.

3. The apparatus of claim 1 wherein the holes in the milled plate second side are formed in parallel lines and aligned with the slots in the first side.

4. The apparatus of claim 1 wherein the slots in the first side are vertically oriented and extend the length of the front face.

5. The apparatus of claim 1 wherein the slots in the first side have a width less than or equal to 1.2 mm.

6. The apparatus of claim 5 wherein the slots in the first side have a width less than or equal to 1 mm.

7. The apparatus of claim 6 wherein the slots in the first side have a width less than or equal to 0.7 mm.

8. The apparatus of claim 1 wherein the holes in the second side have a diameter of less than 5.0 mm.

9. The apparatus of claim 1 wherein the slots in the first side are spaced between 2 and 5 nm apart.

10. An improved radial flow apparatus comprising:
    a vertically oriented, substantially cylindrical vessel having a fluid inlet and a fluid outlet;
    a vertically oriented center pipe disposed within the vessel and having a fluid inlet and a fluid outlet, where either the fluid inlet or fluid outlet comprises apertures in the center pipe wall;

a plurality of vertical ducts arranged circumferentially around the interior of the vessel wall, each outer duct comprising:

a transverse cross-section having a substantially trapezoidal shape comprising a front face, two side faces, and a rear face, where the rear face is proximate to the cylindrical vessel wall, and the front face comprises a milled plate comprising a first side having slots formed therein in a parallel manner and a second side having holes wherein the holes are formed and intersect the slots to allow for the passage of fluid through the plate; and a solid bed retention volume disposed between the center pipe and the plurality of vertical ducts.

11. The apparatus of claim 10 wherein the plurality of vertical ducts are fluid inlet ducts and the center pipe is a fluid outlet pipe.

12. The apparatus of claim 10 wherein the plurality of vertical ducts are fluid outlet ducts and the center pipe is a fluid inlet pipe.

13. The apparatus of claim 10 wherein the slots in the first side have a width less than or equal to 1.2 mm.

14. The apparatus of claim 13 wherein the slots in the first side have a width less than or equal to 1 mm.

15. The apparatus of claim 14 wherein the slots in the first side have a width less than or equal to 0.7 mm.

16. The apparatus of claim 10 wherein the holes in the second side have a diameter of less than 5.0 mm.

* * * * *